United States Patent Office 3,479,313
Patented Nov. 18, 1969

3,479,313
OIL EXTENSION OF LATICES
Robert W. Kreider, Hudson, Ohio, assignor to The General Tire & Rubber Company, Akron, Ohio, a corporation of Ohio
No Drawing. Filed May 6, 1964, Ser. No. 365,488
Int. Cl. C08d 7/00
U.S. Cl. 260—29.7                                    23 Claims

ABSTRACT OF THE DISCLOSURE

This invention comprises a method for introducing an extending oil into rubbery polymer particles in a latex whereby an oil with an electric charge opposite to the electrostatic charge on the polymer particles is mixed into the latex which is heated at least 20° F. above the glass transition temperature of the polymer while the latex-oil mixture is kept stable by keeping the initial charge on the latex particles preponderant. The invention also comprises the resulting product.

---

This invention relates to extension of a latex and more particularly to the oil extension of latex by an electrostatic exhaustion technique.

Emulsions of the type used for paint and thin films must not only possess the common emulsion properties of small particle size and stability, but the emulsion must also be sufficiently stable so that it will not be broken either by the subsequent addition of a pigment or by the mechanical work involved in any pigmentation. The emulsion should maintain its stability during prolonged storage even though subject to marked temperature changes involving freezing and extreme summer heat. Also, the emulsion must not break during reduction for application nor during application. Stabilization, however, must be sufficiently well regulated so that the emulsion will break shortly after application, thereby releasing water, permitting it to escape and a film to form and dry. Oil-in-water emulsions have heretofore been obtained by mixing an emulsifying agent with the oil and adding water. The role of the emulsifying agent thus used has been conventional, that is, reducing the interfacial tension of the water and adsorbing quickly around the emulsified droplets. Emulsifying agents have a hydrophilic portion and a hydrophobic portion in their molecules. The nonpolar or hydrophobic end of the molecule is compatible with the oily material while the polar or hydrophilic end of the molecule is compatible with the water. Mixtures of emulsified oils and latices heretofore produced generally have possessed the characteristics of being relatively unstable and have possessed two types of particles, namely, separate polymer particles and separate oil particles. Films deposited from such mixtures often lack clarity, appear heterogeneous and have been considered undesirable.

It is an object of this invention to oil-extend the polymer in a latex so as to produce a latex which has polymer particles swollen by oil and which is resistant to phase separation, poor film formation and instability.

It is another object of this invention to provide a latex that will deposit, on the surface of various materials, very thin coherent films which are of substantially uniform composition.

It is another object of this invention to produce lustrous films.

It is another object of this invention to produce a latex of smooth consistency.

It is another object of this invention to make use of an inexpensive oil in place of a substantial proportion of expensive high polymer in the film forming portion of a latext paint, while at the same time producing an improvement in the films formed from such paint.

Another object is to produce an oil extended latex while the latex is in suspension or emulsion form.

Yet another object is to incorporate into the latex, a material which will modify the polymer and greatly increase the hiding power of films deposited from the latex.

I have found that the above and other objects are obtained by incorporating into a latex or aqueous dispersion of a rubbery or resinous film forming high polymer, such, for example, as a copolymer of butadiene and styrene, an oil which is compatible with said high polymer. The method of incorporation is exceedingly important to insure that the dispersed particles of polymer are uniformly swollen or plasticized with the oil or oily additive while the particles are still dispersed in the aqueous liquid so that separation of oil and polymer phases will occur neither in the latex nor in films deposited therefrom.

In accordance with this invention, use is made of a difference in the ionic or electrokinetic charge on dispersed polymer particles (latex particles) and the charge on oil globules to drive the oil globules and polymer particles together. When the polymer particles have a negative charge, as is usually the case with rubber latices formed with a water soluble soap emulsifier, the very fine oil globules used for modifying the polymer are formed with a positive charge. The combination of latex with the oil is made under conditions such that the net charge on the latex particles predominates. Consequently, the composite particles all carry a positive charge or all carry a negative charge and coagulation is avoided: If the amount of oil (and dispersant or surfactant therefor) to be added is such that it would cause coagulation or instability of the latex particles, after part of the oil is added, additional surfactant designed to reinforce the original charge on the latex particles may be added before a subsequent addition of oil and surfactant designed for opposite charge is added. The rebuilding of latex charges between each addition of oil is important to prevent instability of the latex mixture.

Incorporation of oil into the polymer particles in the latex is expedited by heating the stabilized latex at least 20° F. above the glass transition temperature of the polymer. This heating step not only insures thorough impregnation of the high polymer particles by the oil but also causes more rapid formation of homogenous particles.

In the preferred method of combining a latex with negatively charged particles with oil, the oil is mixed with a surfactant which is weakly cationic. One which is changed by addition of an acid to the strongly cationic type is usually used. Such surfactants, of which those with a water-soluble portion derived from ethylene oxide and a hydrophobic portion comprising an insoluble amine are illustrative, permit mixing of the oil and latex intimately. By addition of acid the amine becomes strongly cationic and drives the oil into or onto the latex particles.

It has been known that suitably stabilized latices may be shifted from the negatively charged type to the positively charged type by suitably suddenly changing the pH in presence of protective colloids from the basic to the acid side, i.e., to a pH which preferably is 5 or below. Such changes in the latices resulting from the present invention may also be made prior to or after addition of the oil.

The material obtained by the method of the present invention is an aqueous dispersion of high polymer particles swollen by oily material and not a heterogeneous mixture of an oil emulsion and dispersed polymer. There can be no separation of oil phase and a polymer phase, since the extender is now in the latex particle. The extended latex, also, exhibits excellent aging stability.

The extender added to the high polymer latex may be any "oil," by which term is meant any essentially waternon-miscible liquid (or mixture of liquids) suitable for making oil-in-water emulsions which liquid is compatible with the high polymer particles. The extender should be liquid at some time while in contact with the polymer during the incorporation procedure. It does not need to be a liquid at room temperature. It may be a solution of a soluble resin in other oil or solvent. Included among the oils are those that occur naturally, such as linseed oil, olive oil, cocoanut oil, castor oil, animal oils such as sperm oil, vegetable oils, mineral oils, such as lubricating oil, fuel oil, and synthetic oils. The oil should have compatibility with the polymer to the extent that the polymer is extended. For hydrocarbon polymers the oil should preferably be essentially a hydrocarbon or chlorinated hydrocarbon. For economy a mineral oil having a boiling point well above temperatures to be encountered in use but liquid at room temperature or temperatures of 20 or 25° C. is usually used. For ordinary use, the oil should not boil below 450° F. and preferably should not boil below 550–600° F. For butadiene-styrene copolymers, especially those having more than 50% by weight of styrene (including substituted styrene), the naphthenic base mineral oils or oils having a high aromatic content are much preferred. The naphthenic base oils include not only those containing the ordinary monocyclic hydrocarbons but also saturated polycyclic substances which are believed to make up the high boiling point portions of practically all petroleums. Fatty oils or non-hydrocarbon oils may often be preferred when the high polymer is a polyvinyl acetate or copolymer thereof with ethylene or propylene or an acrylate polymer.

In place of or in addition to the natural oils and mineral oils, one may use oily plasticizers such as high boiling esters such as dioctyl phthalate, dibutyl phthalate, butyl octyl phthalate, butyl benzyl phthalate, dioctyl adipate and the like. Such esters are preferable for compatibility with a styrene-acrylate copolymer based latex.

Sometimes, particularly when a harder film is desired, it is necessary to use a relatively hard resin which is soluble or swellable but which is not film forming itself at the desired application temperature. Such may be used in accordance with the present invention by utilizing in place of all or part of an oil a volatile solvent for the resin to serve as a coalescing agent.

The amount of surfactant used with the extender may be varied quite widely as there are differences in the efficiency of various materials. However, the amount used is usually between 0.5% and 10% of the weight of the extender and about 1% to 6% is preferably used. The minimum amount commensurate with stability gives a film of superior water resistance.

While in most cases the liquid should be one which boils well above room temperatures, I have found that a very unique result can be obtained with compatible liquids that will gasify or volatilize at temperatures below those encountered by the paint or film. The polyhaloalkanes compatible with the high polymer, for example, a styrene/butadiene copolymer and having a boiling point of less than 120° F., provide an unexpected opacity to the film. Of this group, chlorofluorinated alkanes boiling between 0° and 100° F. such as dichloromonofluoromethane and trichlorofluoromethane are the most useful. By properly incorporating the said halogenated methane inside the latex particle, the particle on drying expands to provide a great increase in opacity or whiteness similar to that produced conventionally by the use of titanium dioxide.

To assure a proper electric charge on the surface of the oil and polyhaloalkane, a surface active agent is used as aforesaid. However, such surfactant is not necessary where the extender alone possesses a charge opposite to that of the latex.

The surface active agent to be used in the present invention for dispersing the oil should be compatible with the oil, the latex and any polyhaloalkanes used and also with the latex. The particular agent selected depends on the charge desired for the oil. The anionic, cationic, amphoteric and nonionic surface active agents are useful. Examples of the anionic surface active agents include the alkali soaps, such as sodium stearate, potassium oleate and potassium laurate, the soaps of water-soluble amines, the sulfonated oils, the sulfonated fatty alcohols and the fatty alcohols and the fatty alcohol sulfates, the sulfonaphthenates and petroleum sulfonates, the aromatic sulfonates, the sulfosuccinic acid esters, the arylalkyl sulfonates, the sulfonated amides and sulfonated phenols, as well as other sulfonated, phosphated, or borated compounds.

Among the cationic surface active agents are the quaternary ammonium salts of long-chain aliphatic amines such as, for example, stearyl trimethyl ammonium bromide, as well as the quaternary ammonium salts of aromatic amines and long-chain quanidines.

The amphoteric agents usually have a carboxyl group and an amine group preferably separated by a chain of several (10 or more) carbon atoms. Upon acidification the amine becomes a quaternary salt which is strongly cationic and at high pH an anionic soap is formed. Such amphoteric materials facilitate mixing without danger of coagulation as the surface active agent is distributed throughout the mixture before it becomes strongly cationic.

The two best known classes of non-ionic surface active agents are the partial esters of polyhydric alcohols with long chain carboxylic acids, such as glycerol monooleate or monolaurate, and the partial and complete esters of certain water-soluble hydroxy alkyl ethers of polyhydric alcohols with long-chain carboxylic acids, such as diethylene glycol monostearate. The nonionic surfactants are usually used in conjunction with a surfactant of the cationic or anionic type to affect stabilization.

The latex, the particles of which are modified by the present invention, is an emulsion or suspension of high polymer particles in an aqueous medium. The size of the particles of the present are preferably in the neighborhood of about 2000 A. although particles of from 200 A. to 8000 A. may be present.

The latex of the present invention is generally an aqueous dispersion of a solid high copolymer of a conjugated diolefin such as butadiene or isoprene with a copolymerizable vinyl compound which includes the aryl vinyl compounds such as styrene, vinyl toluene, divinyl benzene and alpha methyl styrene, and other vinyl compounds such as acrylic or methacrylic esters including methylacrylate, butylmethacrylate, octyl methacrylate, ethyl acrylate. However, a film forming polymer of an acrylate such as methyl acrylate, ethyl acrylate, 2-ethylhexyl acrylate or a film forming polymethacrylate may be used as well as can polyvinyl acetate and copolymers of vinyl acetate with ethylene or propylene or even vinyl chloride. The amount of cross linking monomer such as divinyl benzene should be small to permit softening and swellability of the polymer by the oil. Higher styrenebutadiene copolymers, i.e. those having 60% to 80% by weight of styrene, are preferred for the extension by hydrocarbon oils and/or polyhaloalkanes, and styreneacrylate copolymers or vinyl acetate ethylene copolymers are preferred when extended by the ester plasticizer and certain oils compatible therewith. Even homopolymers of styrene or other monovinyl monomers may be used when softened to the rubbery state at application temperature by plasticizer.

In the preparation of the compositions of the present invention the oily extender with suitable surfactant for forming either a positive or a negative charge is preferably added slowly or step-wise with agitation to the latex which carries an opposite charge. The charge on the latex is maintained in excess of that carried by the oil droplets as they are formed so that the charge on the latex predominates and a latex is maintained without coagulation.

The extender and polymer particles coalesce, and the extender is absorbed by the polymer particles. This results in a polymer imbibed with oppositely charged extender, and the resultant particles are charged with the charge that predominates.

After the addition of the initial amounts of extender, the polymer will appear to have reached its saturation point because of neutralization. More oil can be added after an additional charge has been built back up on the polymer by the addition of additional surfactant oppositely charged in relation to oil or by a little weak acid or alkali as the case may be. By the use of this step-wise procedure, more extender liquid can be forced into the polymer. It is important to make additions so as to avoid other than instantaneous neutralization thus causing coagulation.

The polyhaloalkane liquid is similarly incorporated into the latex particle using a surface active agent and employing much the same methods as above, but the temperature is maintained below the boiling point of the alkane at the pressure in the mixing apparatus.

Since the collapse of a soft latex particle may occur after its expansion by vaporization of the polyhaloalkane, it is proposed to dissolve into the polyhaloalkane solution of surface active agent a compatible hard resin forming monomer such as styrene plus an oil-soluble catalyst such as benzoyl peroxide or dicumyl peroxide to cause the monomer to polymerize and thus raise the glass transition temperature so that the particles are stiffer. When the latex is a styrene-butadiene copolymer, the desired rigidity of the particle may be accomplished by maintaining the styrene to butadiene ratio above 70 to 30, preferably about 4 to 1 or slightly higher, so that the glass transition temperature or 2nd order transition temperature is above a temperature encountered in use.

The amount of oil incorporated into the latex may be as little as 5 or 10% by weight of the polymer present or may be as much as 50% to 60% by weight of polymer present or even as much as 100%. When less than 5% of oil is present, the benefits of the invention are not significant. When more than 60% of oil is used with polymers which are rubbery at room temperature, the film formed generally becomes too soft. The maximum amount of oil or plasticizer depends on the hardness and molecular weight of the polymer. Harder copolymers such as those of higher styrene content can utilize more oil than softer polymers such as those with higher butadiene content. The higher molecular weight polymers can also accommodate more oil than lower molecular weight polymers without becoming too soft. It has been found that the best results are usually achieved when the polymer has had incorporated into it 15% to 60% oil per 100 parts of polymer in the latex.

The amount of polyhaloalkane may vary from 0.1% to as much as 10% or even 15% based on 100 parts of polymer solids in the latex. As the polyalkane is to be vaporized after the expansion of the polymer particle and is not to remain with the expanded polymer particle, the amounts used are normally kept to a minimum.

The following examples, in which parts are by weight, are illustrative of the invention.

EXAMPLE I

Ninety-five parts of a hydrocarbon oil such as Circolite 2XH and five parts of an oil-soluble weakly cationic surface active agent such as a liquid condensation product of lauryl amine or lauryl amino alcohol with ethylene oxide, which surface active agent forms an oil-in-water-type emulsion with strong positively charged particles when acidified, was blended until a clear solution resulted. This was thereafter used as a stock solution.

EXAMPLE II

A latex of a butadiene-styrene copolymer prepared by suitably polymerizing styrene with butadiene in a weight ratio of 3 to 1 to about 95%+ conversion with .5 part of sodium lauryl sulfate and about 1 part of Santomerse SX (sodium salt of dodecylbenzene sulfonic acid) said latex containing 48% total solids content, was divided into batches each batch containing 416 parts by weight.

Four latex batches were mixed, respectively, with 20, 30, 40 and 50 parts of Circolite 2XH oil added as the stock solution of Example I. Each of the batches of latex were first diluted with water to maintain a total solids content of about 48% after addition of the oil. Thus, batches 1 to 4 were respectively diluted with 44 parts, 67 parts, 88 parts and 108 parts of water. The stock solution was added to each batch slowly. The pH was adjusted to a pH of 5, by adding 5% acetic acid solution. The mixture was then heated to 175° F. to 190° F. for ½ hour while maintaining stirring whereupon it was allowed to cool. Heating is an important feature of my process as it causes more rapid formation of homogenous particles.

After completion of the previous levels of oil modification, physical properties were determined on the oil extended latices and are given in Table I below:

TABLE I

| Properties | 20 Parts | 30 Parts | 40 Parts | 50 Parts |
|---|---|---|---|---|
| Total solids content, percent | 45.8 | 41.9 | 46.6 | 41.1 |
| pH | 5.0 | 4.9 | 5.0 | 5.0 |
| Surface Tension, dyne/cm | 31.7 | 31.3 | 32.0 | 29.9 |
| Film (Mylar) Dips | Clear | Clear | Clear | Clear |
| Mech. Stability [1] | Passes | Passes | Passes | Passes |
| Tack of Dry Film [2] | 9 | 8 | 8 | 7 |
| Stability Room Temp. | Excellent | Excellent | Excellent | Excellent |
| Stability Room Temp. (6 mos.) | Excellent | Excellent | Excellent | Excellent |

[1] This test was conducted by beating several hundred grams of the extended latex in a standard container with a Hamilton Beach malted milk mixer at high speed. If the latex does not show coagulation in one hour the stability is considered excellent and is rated passable.

[2] The film formed from non-oil extended latex was rated 10. Lower numbers indicate a tackier film.

The following example illustrates trichlorofluoro methane imbibed within the latex particles.

EXAMPLE III

A latex of 75/25 butadiene styrene copolymer is mixed with water to provide a latex having 106 grams butadiene-styrene copolymer solids and 581 grams of water. To this latex is added the following: 32 grams styrene monomer, 8.0 grams of trichlorofluoro methane, 0.5 gram of a cationic surfactant such as a quaternary ammonium hydrohalide or acetate of a mono or di alkyl amine having 8 to 18 carbon atoms in at least one alkyl group. The trichlorofluoro methane, cationic emulsifier, and styrene are mixed together and added to the latex in a container which is promptly capped to prevent the escape of the trichlorofluoro methane. Prior to the addition of the said trichlorofluoro methane the latex and the container are chilled well below the boiling point of the methane derivative. The container with its contents is then polymerized with shaking for ½ hour at 120° F. The emulsion is then checked for stability as in the previous example and the time recorded for coagulation to occur. By varying the cationic agent and amounts, stability may be varied.

EXAMPLE IV

|   | Gms. |
|---|---|
| Butadiene-styrene 25/75 copolymer latex (48% solids) | 206.0 |
| HOH [1] | 581.0 |
| Styrene monomer | 32.0 |
| Freon 113 ($CCl_2F$—$CClF_2$) | 8.0 |
| Cationic emulsifier from previous work | 0.50 |
| AIBN catalyst ($\alpha,\alpha'$azobisisobutryonitrile) | 0.03 |

[1] To give 16% T.S.C. prior to blowing.

The following procedure was used. The 206 grams of latex were added to a container equipped for agitation while under pressure. Thirty-seven grams of $H_2O$ were then added to dilute the latex solids. A stock solution was then prepared by mixing:

| | Gms. |
|---|---|
| Styrene | 32.0 |
| Freon | 8.00 |
| AIBN | 0.03 |
| Cationic emulsifier (as in Example III) | 0.50 |

The stock solution was then added under liquifying pressure to the container containing the latex and water blend and the whole was then stirred for 2 hours at 120° F., then heated to 175° F. for 2 hours. About 10 grams of excess Freon 21 was then added to create pressure to blow the material out of the container. The resultant latex was then bled into an open container. The latex thus obtained forms a film that has excellent hiding power.

EXAMPLE V

To 100 parts (solids content) of a butadiene-styrene copolymer latex identical with that of Example II is added 20 to 30 parts of a solution of two parts (75% active) Arquad 2C–75 in circle light oil. The charge on the latex is then adjusted by addition of 1 to 2 parts of Santomerse SX then an additional 20 to 30 parts of said solution of Arquad in circle light oil. The stabilization is repeated by adding 2 parts of Santomerse and the addition repeated until 80 parts of oil is incorporated. All additions to the latex were made with the latex maintained at 175 to 190° F. to cause thorough penetration of the oil into the latex particles. The film formed from the above is clear.

EXAMPLE VI

The following example shows extension of a styrene-acrylate polymer with a plasticizer. All amounts are in parts by weight unless otherwise designated. A latex was prepared by incorporating into a suitable autoclave a mixture of 5.0 parts styrene, 0.4 part nonyl phenyl polyethoxy ethanol (Triton N–101), and 80.0 parts water. To this was then added an emulsifier-catalyst solution consisting of 0.6 part $K_2S_2O_8$, 6.6 parts alkyl aryl sodium sulfonate, anionic (Santomerse SX), and 30.0 parts water. A monomer charge of 64.0 parts, styrene, 27.5 parts 2-ethylhexyl acrylate, 3.0 parts divinyl benzene, and 1.0 part methacrylic acid was then incorporated.

The combined mixture was polymerized for 5¼ hours at 150° F., 1 hour at 180° F., and ½ hour at 130° F. A post stabilizer consisting of 2.6 parts nonyl phenyl polyethoxy ethanol (Triton N–101), 0.84 part $NH_4OH$ (28% $NH_3$), and 2.16 parts water was then incorporated. The final solids content was 47.0%. The pH of the latex was 8.25, the Brookfield viscosity (25.5° C.) was 32 cps.

One hundred parts of the latex thus prepared was mixed with 4 parts of the Santomerse SX and 7 parts water. To this was added 10.15 parts of dioctyl phthalate containing 3.75% of an ethylene oxide condensation product of a primary fatty amine (Ethomeen S/15) and 3.75% of a dicoco dimethyl ammonium chloride (Arquad 2C–75). The mixture was heated at 175–180° F. for 45 minutes with stirring. The resulting solids content was 48.1%.

The plasticizer due to its opposite charge as compared with the latex migrated to the latex particles and was absorbed into the latex particles. The result was a latex particle extended with plasticizer. Paints made from latices extended by the above method have exceptional qualities and low cost.

After completion of the styrene-acrylate copolymer latex extended with the plasticizer as above described, two or more plasticizer extended styrene-acrylate latices were prepared with the same formulation except the plasticizers were butyl benzyl phthalate and dibutyl phthalate. A fourth latex unextended was prepared as a control. A paint based on each latex was prepared by mixing 76 parts by weight of the latex with 124 parts by weight of a base composition comprising:

| Ingredient: | Amount, parts by wt. |
|---|---|
| Water | 432 |
| $NH_4OH$ (28% $NH_3$) | 4 |
| 25% solution of sodium salt of a carboxylated polyelectrolyte (Tamol 731) | 12 |
| A non-ionic defoamer such as Eldefoam 2892 [1] | 16 |
| Phenol mercuricpropionate (Metalsol 57) | 4 |
| Highly purified magnesium montmorillonite thickening agent (Benagel) | 28 |
| Titanium dioxide pigment (Titanox RANC) | 604 |
| Calcium carbonate pigment (Duramite) | 828 |
| Methyl-cellulose (Methocel–4000–65HG) | 544 |
| Polymeric acrylic salt, alkali soluble (Acrylsol ASE–75) | 12 |

[1] May be omitted if desired.

The above paints were evaluated in paint service tests. The results are summarized in Table II and Table III.

TABLE II

| Number | Extender (20 pts. extender/100 pts. latex solids) | Scrub Cycles (to failure) | 75° Gloss Difference [1] (after scrub test) |
|---|---|---|---|
| 1 | Butyl benzyl phthalate | 2,000+ | +7.5 |
| 2 | Dibutyl phthalate | 1,780 | |
| 3 | Dioctyl phthalate | 2,000+ | +6.0 |
| 4 | Control | 2,000+ | +2.0 |

[1] Contact with 5% NaOH for four hours.

TABLE III.—SPOT TESTS

| Number | Water | Alkali |
|---|---|---|
| 1 | Passed | Passed. |
| 2 | do | Do. |
| 3 | do | Do. |
| 4 | do | Do. |

It will be seen from the above examples that there can be substantial economies effected without lowering the quality of the coating compositions. By suitably incorporating dyes, antioxidants, etc. in the plasticizer, great uniformity and improvements may also be made.

While in the above examples I have usually added the oil and emulsifying agent to the diluted latex without first forming the emulsion of oppositely charged particles of oily liquid (including solutions of resins), the extended products of the present invention may also be made by emulsifying the oily material in water to form the emulsion with particles oppositely charged and then adding this emulsion to the latex. The negative charge on the anodic latices must be maintained by suitable addition to prevent coagulation. This may be done by anionic emulsifier added to the latex or by forming the particles with anionic surfaces by treating the latex with oxidizing agent such as potassium persulfate or an equivalent at high temperature such as 200° F. or by use of a carboxylic-monomer such as acrylic or methacrylic acid for part of the monomeric materials used in forming the high polymer.

The oily material used in the above examples may be substituted by other plasticizers or solutions of materials which exert a desirable effect when incorporated in polymer particles or applied so as to envelop them. Thus, solutions of a material in volatile solvent such as a solution of $\alpha,\alpha'$-azobisisobutryonitrile in styrene, benzene or toluene may be incorporated into styrene containing polymers etc. Upon evaporation of or polymerization of the solvent the material remains in the polymer where it may serve as a blowing agent on being subjected to appropriately elevated temperatures.

It is also apparent that in accordance with the provisions of the patent statutes, modifications of the invention may be made without changing the spirit thereof.

What I claim is:

1. A process for the oil extension of a latex having dispersed particles of a solvent-swellable, film-forming, solid high polymer of at least one ethylenically unsaturated monomer selected from the group consisting of conjugated diolefins, vinyl-substituted aromatic hydrocarbons, acrylic acid esters, methacrylic acid esters, acrylic acid, methacrylic acid, ethylene, propylene, vinyl acetate and vinyl chloride, whereby the oil is incorporated into the high polymer particles while they remain dispersed, said process comprising combining with the latex a mixture comprising an oily material, which is compatible with the high polymer particles of the latex, and an emulsifying agent of a type that forms particles of oil with a charge opposite to those on the high polymer particles, the stability of the latex-oil mixture being maintained by keeping the initial charge on the latex particles preponderant; and heating the stabilized latex-oil mixture at least 20° F. above the glass transition of the high polymer of said latex to insure thorough impregnation of the high polymer particles by the oily material, the temperature and pressure of the system being such that the oily material stays essentially in a liquid state until the desired impregnation is effected.

2. The process of claim 1 wherein said oily material is selected from the group consisting of animal oils, vegetable oils, mineral oils, plasticizing esters and polyhaloalkanes.

3. The process of claim 2 wherein the high polymer consists essentially of a copolymer of which at least one monomer is a conjugated diolefin of less than 6 carbon atoms.

4. The method of claim 3 wherein the latex is an aqueous emulsion of styrene-butadiene copolymer having a major proportion of combined styrene.

5. The method of claim 4 wherein the oil is principally a hydrocarbon oil and is present in amounts of 5 to 60 parts by weight per 100 parts of high polymer in said latex.

6. The method of claim 5 wherein the initial latex is an alkaline latex with negatively charged particles, the oily material is mixed with a material that in the presence of an acid is a cationic emulsifier, and the stabilization is accomplished by maintaining a preponderance of anionic emulsifier after each addition of oily material.

7. A process for extending an aqueous dispersion of high polymer latices having particles of solid high polymer of at least one ethylenically unsaturated monomer selected from the group consisting of conjugated diolefins, vinyl-substituted aromatic hydrocarbons, acrylic acid esters, methacrylic acid esters, acrylic acid, methacrylic acid, ethylene, propylene, vinyl acetate and vinyl chloride, said particles having a negative charge thereon as evidenced by being attracted to an anode, said high polymer having a major proportion by weight of at least one combined monoolefinic compound therein, said process comprising incorporating into said aqueous dispersion of high polymer an emulsion of oily material selected from the group consisting of animal oils, vegetable oils, mineral oils, plasticizing esters and polyhaloalkanes, said emulsion of oily material being compatible with said high polymer and having a charge opposite to that on the particles of said high polymer, the stability of the resulting mixture being maintained by keeping the initial charge on the latex particles preponderant, and heating the mixture at least 20° F. above the glass transition temperature of the high polymer to insure uniform impregnation of the high polymer particles by the oily material.

8. A process according to claim 7 wherein the oily material and emulsifying agent are added in increments, the emulsion is stabilized by added anionic emulsifying agent when necessary after incremental addition and the weight of oily material does not exceed the weight of high polymer.

9. A process according to claim 7 wherein the emulsifying agent in said emulsion is cationic in the presence of an acid, the ultimate mixture is acidified prior to heating, the stability of the ultimate mixture is maintained by keeping the initial charge on the latex particles predominant and the oily material is present in the ultimate mixture in an amount from 10 to 50 parts by weight per 100 parts of high polymer in said latex.

10. The method of claim 7 wherein the charge on the latex particles is maintained sufficiently negative for stability by addition of non-cationic emulsifying agent.

11. A latex composition of the type used in water base coating compositions and the like comprising an aqueous dispersion of individual particles which contain a high copolymer of a conjugated diolefin of less than 6 carbon atoms and a monoolefinic compound, an oily material compatible with the high copolymer, said oily material being selected from the group consisting of animal oils, vegetable oils, mineral oils, plasticizing esters and polyhaloalkanes, the weight of said oily material not exceeding the weight of said high copolymer, and a mixture both of an anionic and a cationic oil-in-water emulsifying agent, one being in preponderance, said latex being stabilized by a pH which, when said cationic agent is in predominance, is below 5.0 and which, when said anionic is predominant, is above 8.0, the charge on the latex particle being always preponderant.

12. The composition of claim 11 wherein the polymer is a styrene-butadiene copolymer having a major portion of styrene.

13. The composition of claim 12 wherein the oily material is a hydrocarbon oil and is present in amounts of from 5 to 60 parts by weight per 100 parts by weight polymer in said latex.

14. A process of extending an aqueous dispersion of film-forming high polymer latices having particles of solid high polymer of at least one ethylenically unsaturated monomer selected from the group consisting of conjugated diolefins, vinyl-substituted aromatic hydrocarbons, acrylic acid esters, methacrylic acid esters, acrylic acid, methacrylic acid, ethylene, propylene, vinyl acetate and vinyl chloride, said particles having a positive charge thereon, said process comprising incorporating into said aqueous dispersion of high polymer a compatible liquid extender selected from the group consisting of animal oils, vegetable oils, mineral oils, plasticizing esters and polyhaloalkanes and an anionic emulsifying agent, the stability of the resulting mixture being maintained by keeping the initial charge on the latex particles preponderant, and heating the mixture at least 20° F. above the glass transition temperature of the high polymer to insure uniform impregnation of the high polymer particles by the liquid extender.

15. The composition of claim 11 wherein the solution used to control pH is alkaline and the oily material is 10–50 parts by weight based on 100 parts of high polymer in said latex.

16. A process according to claim 1 wherein the oily material is a polyhaloalkane and the latex-oil mixture is maintained at a sufficient temperature and pressure for a time sufficient to assure thorough penetration of the polymer particles by the polyhaloalkane.

17. The process of claim 16 wherein the polyhaloalkane is a derivative of a fluorinated alkane having a boiling point below 120° F.

18. The process of claim 17 wherein the polymer of the latex is a styrene-butadiene copolymer having a major portion of styrene.

19. The process of claim 18 wherein the mixture is heated to 120° F. and agitated to impregnate the high polymer.

20. A process according to claim 1 wherein the oily material is a liquid phthalic acid ester.

21. A process for the oil extension of a latex emulsion or suspension of a solid high polymer of an ethylenically unsaturated monomer, whereby the oil is incorporated into latex particles while they remain dispersed, said high polymer being further characterized by having a major proportion of its weight made up of units of combined mono-olefinic compound, which comprises combining with the latex a mixture comprising an oily material, which is compatible with the polymer of the latex, and an emulsifying agent of a type that forms an oil-in-water emulsion having particles of oil with a charge opposite to those on the latex particles, and maintaining stability of the latex-oil mixture by preventing reversal of charge on the dispersed latex by keeping the initial charge on the latex particles preponderant.

22. A process according to claim 7 wherein the high polymer has a generally linear structure.

23. A product produced by the process of claim 22.

References Cited

UNITED STATES PATENTS

| | | | |
|---|---|---|---|
| 3,097,179 | 7/1963 | Ceintrey | 260—29.7 |
| 2,648,644 | 8/1958 | McMillan et al. | 260—33.6 |
| 2,835,645 | 5/1958 | D'Ianni et al. | 260—29.7 |
| 2,875,170 | 2/1959 | Ayers et al. | 260—33.6 |
| 2,899,401 | 8/1959 | Eby | 260—33.6 |
| 2,955,097 | 10/1960 | White | 260—29.7 |
| 2,970,125 | 1/1961 | Smith et al. | 260—29.7 |

OTHER REFERENCES

Schildknecht, Polymer Processes, Interscience Publishers Inc., N.Y., 1956, vol. 10, page 138.

MURRAY TILLMAN, Primary Examiner

J. T. GOOLKASIAN, Assistant Examiner

U.S. Cl. X.R.

260—2.5, 23.7, 28.5, 29.6, 31.8, 33.6, 34.2, 96, 743, 744, 752, 758, 761, 875, 879, 885, 886